United States Patent
Ions et al.

(10) Patent No.: US 6,230,746 B1
(45) Date of Patent: May 15, 2001

(54) RECOVERABLE ARTICLE

(76) Inventors: David Ions, 1 Coxs Road, Shrivenham, Wiltshire, SN6 8EL (GB); Philip Roland Winfield, Churchfield House, Latton, Swindon, Wiltshire, SN6 6DS (GB); Josef Toerringer, D-83128 Halfing, Sonnendorf 4 (DE); George Gansbuehler, 4 Harptree Close, Nine Elms, Shaw, Swindon, Wiltshire, SN5 9UN (GB); Sean Michael Lewington, 9 Totterdown Close, Swindon, Wiltshire, SN3 5DT (GB); Philip Costigan, 41 Ravenscroft, Covingham, Swindon, SN3 5AE, Wiltshire (GB)

( * ) Notice: Subject to any disclaimer, the term of this patent is extended or adjusted under 35 U.S.C. 154(b) by 0 days.

(21) Appl. No.: 09/380,473
(22) PCT Filed: Mar. 18, 1998
(86) PCT No.: PCT/GB98/00810
  § 371 Date: Sep. 3, 1999
  § 102(e) Date: Sep. 3, 1999
(87) PCT Pub. No.: WO98/42054
  PCT Pub. Date: Sep. 24, 1998

(30) Foreign Application Priority Data

Mar. 19, 1997 (GB) .................................................. 9705695

(51) Int. Cl.⁷ ....................................................... F16L 3/12
(52) U.S. Cl. .......................... 138/106; 138/113; 138/155; 138/157; 138/173
(58) Field of Search ..................................... 138/113, 106, 138/128, 153, 120, 155, 157, 173

(56) References Cited

U.S. PATENT DOCUMENTS

| | | |
|---|---|---|
| 3,515,798 | 6/1970 | Sievert . |
| 3,824,331 | 7/1974 | Mixon, Jr. et al. . |
| 4,070,746 | 1/1978 | Evans et al. . |
| 4,233,731 | 11/1980 | Clabburn et al. . |
| 4,237,609 | 12/1980 | Clabburn et al. . |
| 4,332,849 | 6/1982 | Barkus et al. . |
| 4,410,009 | 10/1983 | Blum . |
| 4,824,502 | * 4/1989 | Nogayoshi et al. ................. 138/129 |
| 5,799,704 | * 9/1998 | Andre ................................. 138/146 |
| 5,856,634 | 1/1999 | Borgstrom . |
| 5,884,670 | * 3/1999 | Akedo et al. ........................ 138/119 |

FOREIGN PATENT DOCUMENTS

| | | |
|---|---|---|
| 0435569 | 7/1991 | (EP) . |
| 0530952 | 3/1993 | (EP) . |
| 0590469 | 4/1994 | (EP) . |
| 0683557 | 11/1995 | (EP) . |
| 2018527 | 10/1979 | (GB) . |
| 1556677 | 11/1979 | (GB) . |
| WO 98/27632 | 6/1998 | (WO) . |

OTHER PUBLICATIONS

Derwent Abstract No. 94–110968/14 (abstract of EP 0,590, 469), Apr. 1994.
Patent Abstracts of Japan, vol. 8, No. 20 (M–271) (abstract of JP 58–179634 (Sumitomo Electric)), Apr. 1982.

* cited by examiner

*Primary Examiner*—James Hook
(74) *Attorney, Agent, or Firm*—Myers Bigel Sibley & Sajovec

(57) ABSTRACT

A recoverable article includes an inner resilient tubular member that is held in a laterally exapanded configuration by engagement with outer holdout strips, wherein the outer surface of the inner member is provided with a plurality of channels extending therealong and the holdout strips occupies the channels so as to provide said holdout engagement, wherein the holdout strips is arranged to be removed intact without any substantial change in the molecular structural properties of the holdout strips; thereby to allow recovery of the inner tubular member towards its unexpanded configuration.

26 Claims, 3 Drawing Sheets

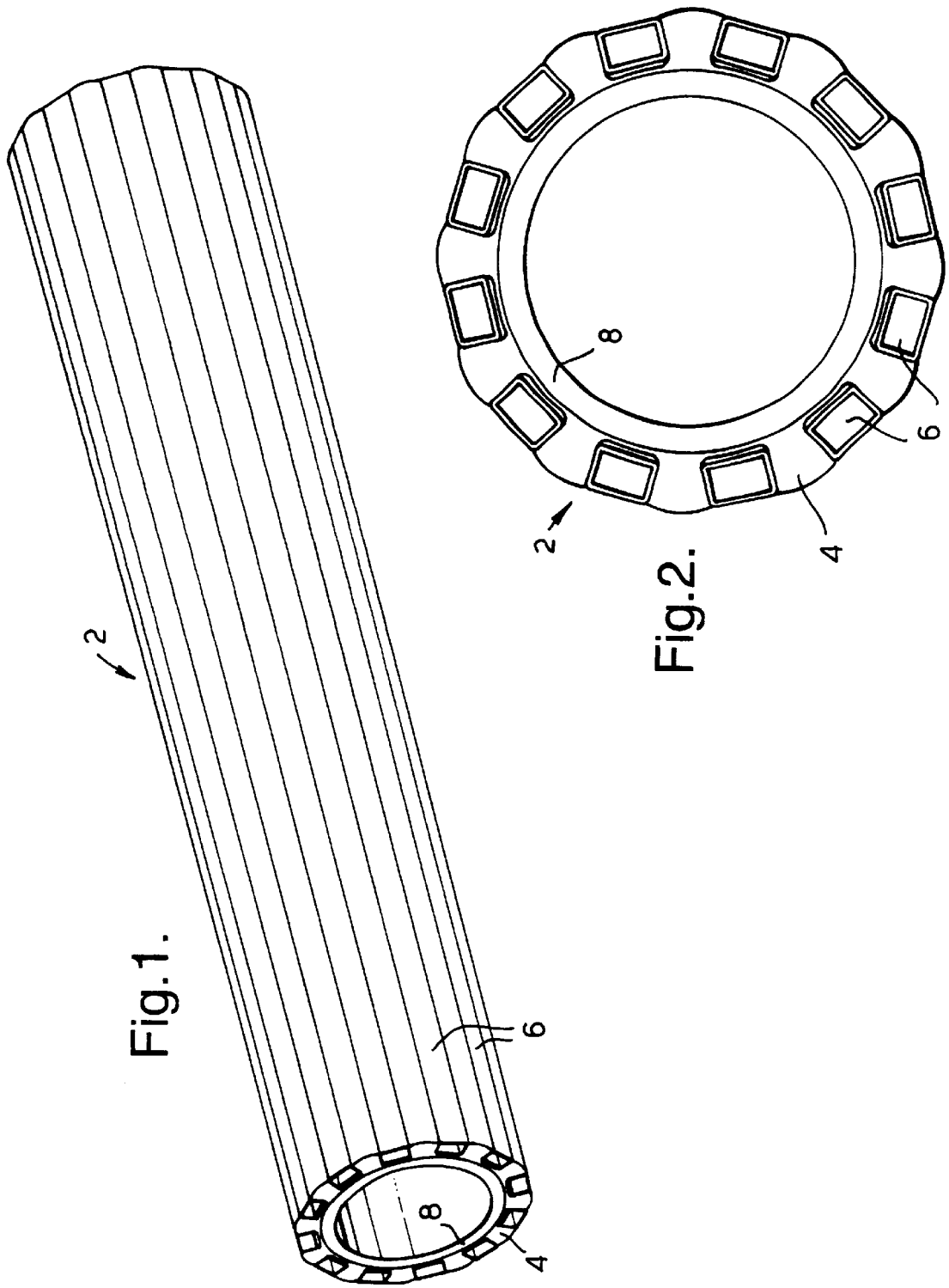

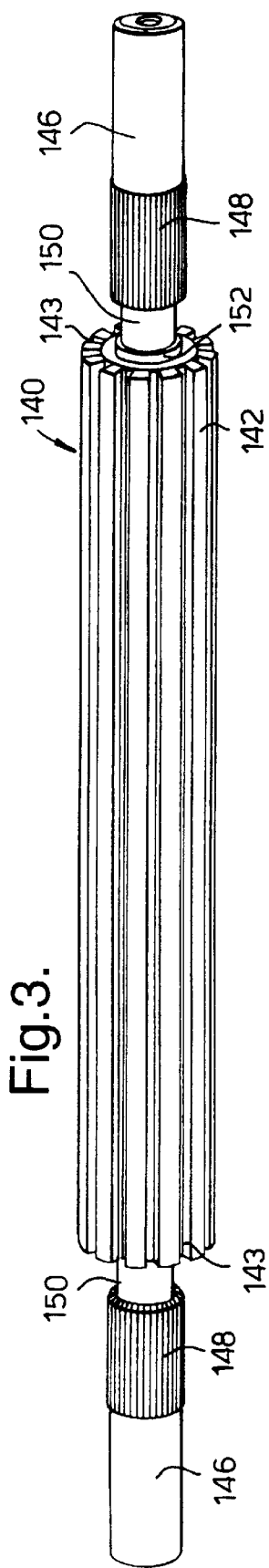
Fig.3.
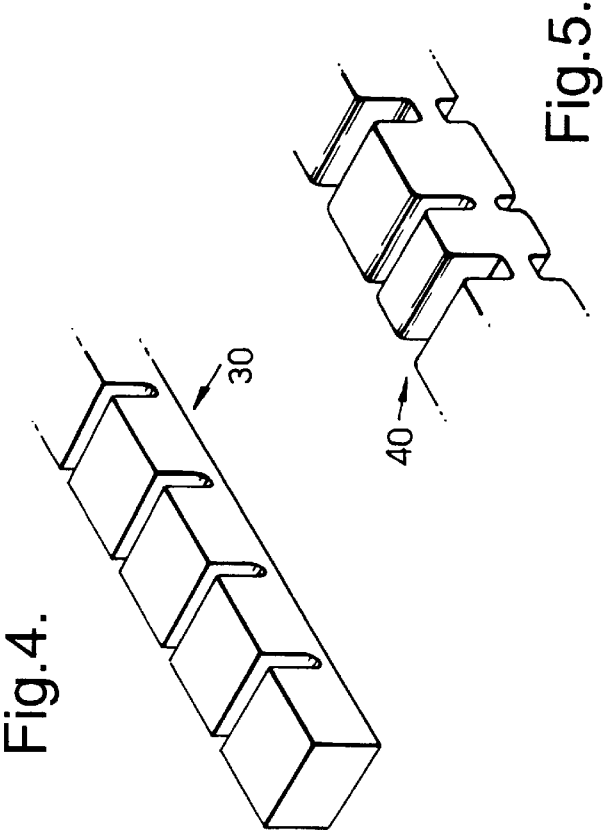
Fig.4.
Fig.5.

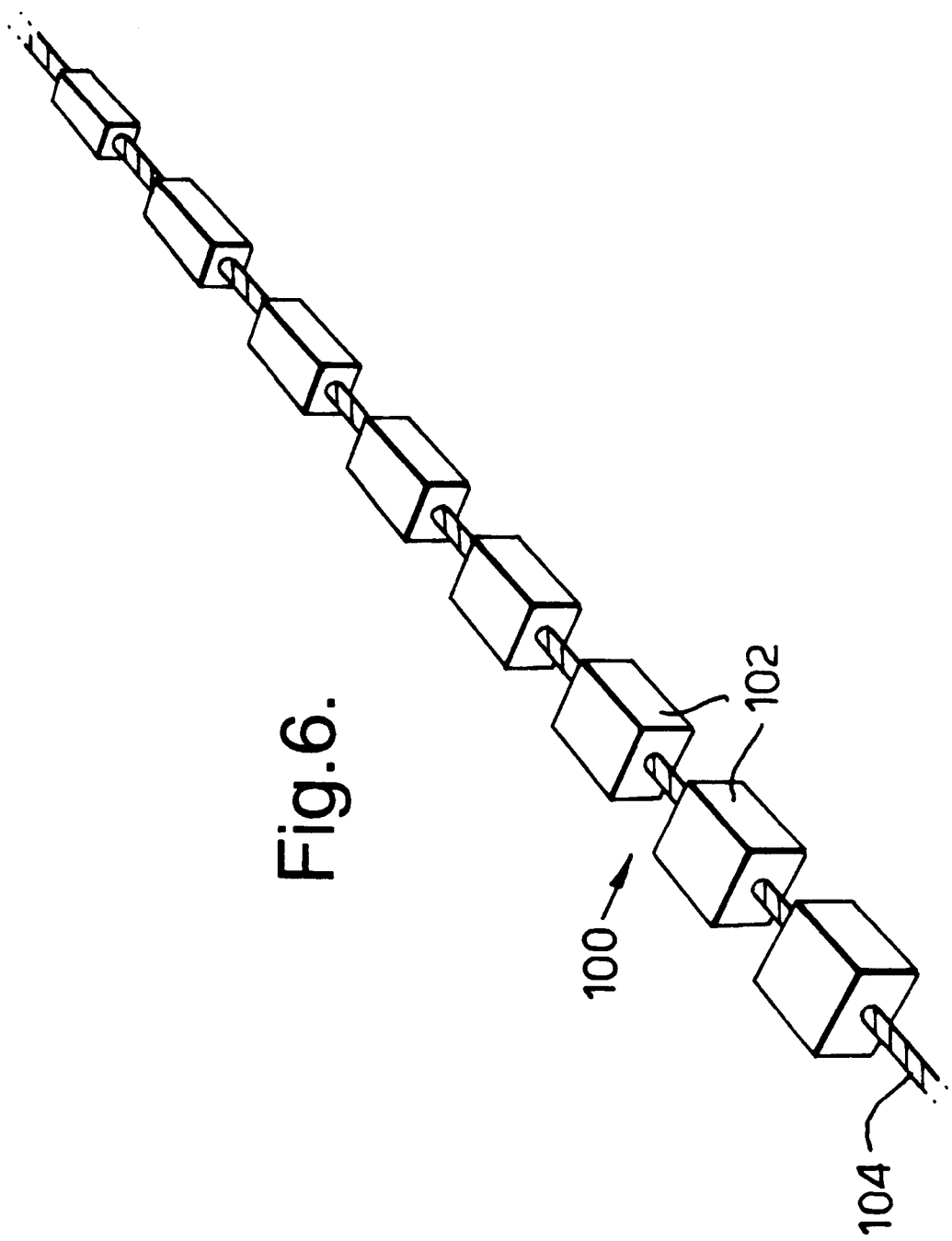

RECOVERABLE ARTICLE

This invention relates to a recoverable article for, and method of, enclosing an elongate substrate. The substrate may comprise for example a cable, which may be an electrical power or telecommunications cable, and in particular a cable connection. The cable connection may comprise a joint, or splice, between two, or more, cables, or a termination of a cable, for example on to a terminating lug or bushing connected to electrical equipment such as switchgear or a transformer. The termination may comprise an adapter, for example an elbow.

The invention will be further particularly described with reference to an in-line joint between two electric power cables, but it is to be understood that this is by way of example only and not by way of limitation.

Joints between two power cables, whether either or both are polymeric or paper insulated cables, need to be enclosed within a protective arrangement that includes an electrically insulating layer. Heat shrink technology has been applied for this purpose for many years, with products available from Raychem and others. However, technologies that do not require heat are also employed. Push-on sleeves and elbows are available but unlike heat shrinkable products, these have severe range-taking limitations that necessitate a large inventory. Other so-called cold applied solutions require a tubular elastomeric sleeve to be radially expanded and mounted on a rigid holdout member, the internal diameter of which is larger than the maximum outer diameter of the cable joint to be enclosed. One example of the latter is the PST sleeve available from 3M, as exemplified in U.S. Pat. No. 3,515,798. Such a sleeve has an inner holdout member that consists of a continuous narrow strip of tough flexible material in the form of a rigid closed helix having adjacent coils interconnected. The held out sleeve is mounted over the cable joint and the helical strip is then unwound, thus allowing the insulating stretched elastic cover to shrink down onto the joint. However, it is inconvenient having to unwind the holdout strip helically around the extended cable, especially if the work has to be done in the confined space of a trench or manhole. Another example of a cold applied arrangement is disclosed in U.S. Pat. No. 3,824,331 (AMP), in which a resilient tubular cover is supported in a stretched condition by an easily removable external one piece support member, each end of the cover being rolled back over the outside of the support. The cover and support member are mounted on an internal sleeve in the form of a longitudinally slit tube held in a state of increased diameter by a dividing strip in the shape of an I-beam. When in position over the cable joint, removal of the dividing strip longitudinally from the slit allows the inner tube to be squeezed and then freely withdrawn from the cover. The cover ends are then unrolled onto the adjacent cable sections and the external support member is removed. It will be appreciated that such an arrangement requires an inner and an outer holdout member, each of which has to be removed. EP-B-O 530 952 (3M) discloses a cover assembly in which an elastomeric tube is held out in a stretched condition on an inner support core. The core is frangible such that application thereto of a force beyond that produced by the tube causes breakage of the core so as to allow contraction of the elastomeric tube onto the substrate. The fragments of the collapsed core remain within the tube and must therefore be as small as possible to facilitate accommodation therewithin.

With each of these arrangements, the holdout member is disposed internally of the sleeve that is to be applied to the substrate cable. Thus, the sleeve cannot conveniently have an internal coating, of gel, mastic or adhesive for example, applied thereto. This problem, is avoided by the recoverable sleeve assembly disclosed in U.S. Pat. No. 4,410,009 (Sigmaform), in which an inner elastomeric tube is maintained in a radially-stretched condition by having an outer rigid tube surrounding and secured to the outer surface thereof. The outer tube is a rigid thermosetting adhesive polyurethane whereby the outer tube is sufficiently adhesive to hold the inner tube in its stretched condition but will peel from the inner tube upon impact of force. U.S. Pat. No. 4,070,746 (Raychem) discloses a recoverable tubular article in which an elastomeric sleeve is retained in a radially expanded condition by an outer constraint that is bonded thereto. The restraint is sufficiently strong to retain the sleeve in its expanded form under ordinary conditions of storage, but is susceptible to attack by solvents that weaken the bond sufficiently to allow the elastomeric sleeve to peel away from the restraint and to recover towards its original state. U.S. Pat. No. 4,233,731 (Raychem) discloses a dimensionally-recoverable article comprising a hollow resilient member which has been expanded to a dimensionally unstable configuration in which it is retained by a keeper positioned between and separating two parts of the hollow member away from the path of recovery thereof. The keeper is made from a material that weakens or changes its shape upon heating and/or chemical treatment, for example by being chemically degradable when subjected to a solvent. In one embodiment a single wedge of fusible material is interposed in the break in the circumference of a split tube of beryllium copper alloy. In another embodiment a tubular member made from a engineering plastics material has dovetailed protuberances on its outer surface between which strips of a polycarbonate are inserted to maintain the expanded configuration. EP-A0590469 (Kabelmetal) discloses a recoverable elastomeric tubular article that is held in its expanded state by thermoplastic bracing means in the form of a profile applied helically to the outer surface of the expanded tube.

It is an object of the present invention to provide a recoverable article and its method of manufacture, in which the article is held out in its expanded configuration by an advantageous external holdout means so as not to interfere with any inner layer, of gel, adhesive or mastic material for example, which may be applied internally thereof as a coating or which may be located around the substrate to be enclosed.

Thus, in accordance with one aspect of the present invention, there is provided a recoverable article comprising an inner resilient tubular member that is held out in a laterally expanded configuration by engagement with an outer holdout means, wherein the outer surface of the inner member is provided with a plurality of channels extending therealong and the holdout means occupies the channels so as to provide said holdout engagement, wherein the holdout means is arranged to be removed intact without any substantial change in the molecular structural properties of the holdout means, thereby to allow recovery of the inner tubular member towards its unexpanded configuration.

The article of the present invention, in contrast with the known holdout arrangements described above, is thus arranged to recover by simple removal of the holdout means that does not involve the application of heat or a chemical treatment, including the application of a solvent, nor the physical destruction of the holdout means, with the advantage of simplification of installation on a substrate. The simplification achieved by the present article is based on the realisation that by selection of appropriate materials of, and if necessary with appropriate shaping of the physical interengagement between, the holdout means and the inner resilient tubular member, the resilient member can not only be held out when required, namely during storage and transport, but also can be made to recover when needed by simple pulling out of the holdout means, such as the peeling of elongate strips, from the channels of the inner member. Thus, the relationship between the recovery force tending to return the article towards its original, unexpanded configuration, can be balanced with the coefficient of friction at the interface between the holdout means and the resilient member. Conventionally, the recovery force and the friction have needed to be so high in order to provide the holding out, that it has not been possible, at least manually, conveniently simply to remove the holdout means, intact, from the expanded article. By selecting material for the member that is held out to be of sufficiently low modulus, and/or selecting the wall thickness to be as low as possible, consistent with the purpose of the article, and/or arranging for the interfacial friction to be sufficiently low, using a lubricant and/or appropriate shaping, it has now been realised that a much simpler holdout arrangement can be provided than was hitherto thought to be possible.

Preferably, the holdout means comprises a plurality of strips that are disposed as a tight fit in respective ones of the channels. Each strip may comprise a plurality of longitudinally spaced-apart holdout members that substantially fill its cavity at discrete positions along its length, successive holdout members of each strip being linked together. The holdout members may be integral with the links therebetween, and may be of a high modulus polymeric material. Alternatively, the links, which may be provided by a continuous backing layer for example, may be formed from an elastomeric layer and the discrete holdout members may be of a high modulus material. Alternatively, and preferably, each strip may substantially fill its channel at every point along its length, for example as by having a substantially uniform cross section therealong. The strips may be hollow or solid.

In embodiments in which the holdout means comprises a plurality of strips, the article may include one or more (preferably two) supports, for example in the form of rings, to retain the tubular member (preferably via the holdout strips), in a substantially circular cross-sectional configuration. The or each support is preferably located radially inwards of the holdout strips and/or the tubular member. The or each support may be located adjacent to an end of the tubular member, preferably exterior to the tubular member.

In a further embodiment the holdout may be formed by a layer extending around the entire circumference of the inner member and bonded thereto so as to extend over the top of the cavities. In its holdout configuration, the layer may be deflected into the cavities, and may be flipped outwards, for example progressively from one end of the article to the other, so as to hinge to a configuration that allows recovery of the article. Advantageously, the channels in the outer surface of the resilient inner member are formed by it having a castellated configuration.

Advantageously, the channels in the outer surface of the inner member are reentrant so as to enhance retention of the holdout means.

Advantageously, the channels in the outer surface of the inner member are re-entrant so as to enhance retention of the holdout means.

It will be appreciated that the shaping of the cavities has to be such as to ensure that the inner member is retained in its expanded configuration under expected conditions of storage and transport to its place of application and then to be released without the need for undue force, preferably manually, when the article is to be applied to a substrate. The shaping of the interface between the inner member and the holdout means will thus depend on factors such as (i) the material of the inner tubular member and of the holdout means, in particular the relative hardness, and (ii) the force within the expanded tubule a member tending to cause it to recover, which will itself depend on the material, the expansion ratio of the member, and its thickness. Thus, for example a thickwalled inner member made of highly expanded, relatively high modulus material would require a relatively greater amount of mechanical interlocking by the holdout means due to its relatively high recovery forces.

The inner member is preferably made from polymeric, preferably elastomeric material.

one or both ends of the inner tubular member may advantageously have a bevelled (especially chamfered) internal surface. This can help to prevent the end of the tubular member digging into a substrate (e.g. a cable) around which it is recovered.

The inner member may form part of an enclosure for an electric cable splice, termination, or the like, and may be formed from electrically conductive material, for example for forming electrical continuity across, and/or electrical screening of, the joint. The inner tubular member may have one, or more, further layers on its inner surface, which may be co-extruded therewith. For example, an electrically insulating layer and/or an electrically stress grading polymeric layer may be co-extruded internally with the inner member. Such an additional layer may have different mechanical properties from the inner member, for example by being more resilient so as to enhance conformity with the substrate, for example a cable splice. There may also be an innermost electrically conductive layer, for example extending along only part of the length of the other layer(s), to provide a Faraday cage. An inner layer of gel, mastic or adhesive may be provided to enhance conformability and sealing, for example to exclude air and/or moisture, with the substrate. It is also envisaged that such a sealant layer may be applied separately to the substrate.

In accordance with another aspect of the present invention, there is provided a substrate, for example a cable joint, termination or elbow, enclosed by a recovered article in accordance with the said one aspect of the present invention.

The holdout means may be applied in a flowable form, and held in place by a wrapping, of polymeric or other suitable material. The flowable material is arranged to be a hardenable, or curable, material, such as plaster of paris, cement, a curable epoxy resin system or other thermoset, which may or may not require a wrapping. In general, however, whether or not the holdout means is initially flowable, it may be desirable to enclose the article of the invention within an outer sheath to enhance retention of the holdout means during storage and transport.

The holdout means may comprise foam, preferably high density foam, which may be formed in strips to fit channels in the outer surface of the inner member for example, or which may be foamed in situ to fill the expanded cavities.

The holdout means may be formed, especially when of strip configuration, of material that exhibits good resistance to compression in the transverse direction, whilst exhibiting more flexibility, or brittleness, in the longitudinal direction of the inner member, thereby to facilitate controlled removal thereof, and thus controlled recovery of the inner member. Cardboard has been found to be a suitable material, for example a material comprising composite layers of Kraft board approximately 0.9 mm thick. Wooden laths, fibre board or plasterboard are also suitable materials. In the latter case, a board comprising a layer of plaster 9 mm thick laminated between layers of cardboard giving an overall thickness of about 10 mm has been found suitable. Such holdout means are comparatively cheap and are also bi-odegradable. It is also envisaged, however, that the holdout means of the article of the invention may be polymeric, preferably bi-odegradable.

The holdout means may be extruded on to the outer surface of the inner tubular member.

In accordance with a further aspect of the present invention, there is provided an elongate substrate, which may comprise an electrical component, for example an electric cable splice, termination or elbow, enclosed by a recovered article in accordance with the said one aspect of the invention, in which the holdout means is peeled away from the inner member from one end to the other.

Recoverable articles, each in accordance with the present invention, will now be described, by way of example, with reference to the accompanying drawings, in which:

FIG. 1 is an isometric view of one embodiment of recoverable article;

FIG. 2 is an end view of the article of FIG. 1;

FIG. 3 is an isometric view of the article of FIGS. 1 and 2 forming part of an in-line power cable splice; and FIGS. 4, 5 and 6 show part of further alternative holdout means.

FIGS. 1 and 2 show a recoverable article 2 in which an inner resilient tubular member 4 having a castellated outer surface has been radially expanded. The expansion has widened the twelve channels of the castellations that extend parallel to each other, and these have been filled by respective holdout strips 6, each of which is of a high modulus polymeric material, hollow, of generally rectangular cross-section, and extends from one end of the member 4 to the other. An innermost layer 8 of elastomeric material is bonded to the inner surface of the member 4. The strips 6 are such that they can be peeled out of their respective channels, thereby to allow the article 4, 8 to recover.

FIG. 3 shows an article 140 in accordance with the preceding embodiment, in its recovered condition on an in-line electric power cable splice. The article 140 consists of a castellated electrically conductive resilient member 142, showing its channels 143, and an innermost layer 144 of polymeric electrically insulating material. Each cable has an outer polymeric jacket 146, folded back earth screen wires 148, and primary dielectric 150. Prior to the recovery of the article 140, the region around the connector of the cable conductors (not shown) has been enclosed within a layer 162 of stress controlling material, that has been compressed into conformity with the underlying components by the recovery of the article 140, thereby excluding air from the splice region. Although not shown, it will be understood that an outer protective jacket is to be applied to the splice as shown in FIG. 3 so as to encompass the article 140 and to seal on to each cable jacket 146. Electrical continuity across the joint, via the conductive layer 142, between the cable wires 148 will also be made. Advantageously, the outer protection jacket is as disclosed in British Patent Application No.9626364.5, the entire contents of which are included herein by this reference.

In a further embodiment, a reduction in friction between the holdout strips and the channels of the castellations is achieved or enhanced by spray coating the sides of the channels of the inner member or of the holdout strips with a low friction material, or by applying a grease thereto. Such an embodiment may then need a temporary sheath or covering to retain the holdout means in engagement until the article is to be applied to a substrate.

FIGS. 4 and 5 show alternative holdout strips 30, 40 respectively, formed by extrusion of sheet material.

The embodiments of holdout means described so far have been of strips of uniform cross-section so as to engage the channels of the inner resilient member continuously along the length thereof. The holdout strip 100 of FIG. 6, on the other hand, comprises a series of polymeric blocks 102 spaced apart along a piece of string or wire 104. The blocks 102 are shaped so as to fit into the expanded channels of the inner holdout member, and each strip 100 can then be removed from its channel by pulling the wire 104 in a peeling manner.

What is claimed is:

1. A recoverable article comprising an inner resilient tubular member that is held out in a laterally expanded configuration by engagement with an outer holdout means, wherein an outer surface of the inner resilient tubular member is provided with a plurality of channels extending therealong and the holdout means occupies the channels so as to hold the inner member in the laterally expanded configuration, wherein the holdout means is arranged to be removed intact without any substantial change in the molecular structural properties of the holdout means, thereby to allow recovery of the inner tubular member towards its unexpanded configuration, wherein the holdout means comprises a plurality of strips that are disposed in respective ones of the channels and wherein each strip is hollow.

2. An article according to claim 1, wherein the holdout means comprises:
    (a) a cured material; or
    (b) high density foam material; or
    (c) compacted fibrous material;
        said material being retained in place by an enveloping cover, if required.

3. An article according to claim 1, wherein the holdout means comprises form-stable bio-degradable material.

4. An article according to claim 1, wherein the inner tubular member is electrically conductive.

5. An article according to claim 1, wherein the inner tubular member is made from polymeric elastomeric material.

6. An article according to claim 1, comprising an additional, radially inner, resilient tubular arrangement on which the inner tubular member is mounted integrally therewith.

7. An article according to claim 6, wherein the additional tubular arrangement comprises at least one tubular member that is more resilient than the inner resilient tubular member.

8. An article according to claim 6, wherein the additional tubular arrangement comprises an electrically insulating tubular member and/or an electrically stress-controlling tubular member.

9. An article according to claim 6, wherein the additional tubular arrangement is made from polymeric material.

10. An article according to claim 6, comprising an innermost electrically conductive layer radially inwards of the additional tubular arrangement, and located only in a longitudinally central region of the article so as to provide a Faraday cage.

11. An article according to claim 1, of substantially right-cylindrical configuration.

12. An article according to claim 11, wherein the wall thickness and/or modulus of the inner tubular member, and of any other layer bonded thereto or integral therewith, are selected so as to allow said removal of the holdout means.

13. An article according to claim 12, wherein the materials of the holdout means and the inner tubular member are selected such that the coefficient of friction therebetween allows said removal of the holdout means.

14. A recoverable article comprising an inner resilient tubular member that is held out in a laterally expanded configuration by engagement with an outer holdout means, wherein an outer surface of the inner member is provided with a plurality of channels extending therealong and the holdout means occupies the channels so as to hold the inner member in the laterally expanded configuration, wherein the holdout means is arranged to be removed intact without any substantial change in the molecular structural properties of the holdout means, thereby to allow recovery of the inner tubular member towards its unexpanded configuration, wherein the holdout means comprises a plurality of strips that are disposed in respective ones of the channels and wherein each strip comprises a plurality of longitudinally spaced-apart holdout members that substantially fill its respective one of the channels at discrete positions along the respective one of the channels, successive holdout members of each strip being linked together through link portions which do not substantially fill the respective one of the channels.

15. An article according to claim 14, wherein the channels are formed by the outer surface of the inner member being of castellated configuration.

16. An article according to claim 14, wherein the holdout means comprises:
 (a) a cured material; or
 (b) high density foam material; or
 (c) compacted fibrous material;
   said material being retained in place by an enveloping cover, if required.

17. An article according to claim 14, wherein the holdout means comprises form-stable bio-degradable material.

18. An article according to claim 14, wherein the inner tubular member is electrically conductive.

19. An article according to claim 14, wherein the inner tubular member is made from polymeric elastomeric material.

20. An article according to claim 14, comprising an additional, radially inner, resilient tubular arrangement on which the inner tubular member is mounted integrally therewith.

21. An article according to claim 14, of substantially right-cylindrical configuration.

22. A recoverable article comprising an inner resilient tubular member that is held out in a laterally expanded configuration by engagement with an outer holdout means, wherein an outer surface of the inner member is provided with a plurality of channels extending therealong and the holdout means occupies the channels so as to hold the inner member in the laterally expanded configuration, wherein the holdout means is arranged to be removed intact without any substantial change in the molecular structural properties of the holdout means, thereby to allow recovery of the inner tubular member towards its unexpanded configuration, wherein the channels are re-entrant, thereby to enhance retention of the holdout means.

23. A recoverable article comprising an inner resilient tubular member that is held out in a laterally expanded configuration by engagement with an outer holdout means, wherein an outer surface of the inner member is provided with a plurality of channels extending therealong and the holdout means occupies the channels so as to hold the inner member in the laterally expanded configuration, wherein the holdout means is arranged to be removed intact without any substantial change in the molecular structural properties of the holdout means, thereby to allow recovery of the inner tubular member towards its unexpanded configuration, wherein the holdout means comprises a plurality of strips that are disposed as a tight fit in the respective ones of the channels, the strips being hollow at least at their end regions, and release means for engaging within the strips so as to cause them to be removed from the channels.

24. A recoverable article comprising:
an inner resilient tubular member having an outer surface including a plurality of re-entrant channels extending therealong, the inner resilient tubular member having a laterally expanded position and an unexpanded position;
a plurality of strips removably disposed in respective ones of the channels, the strips being removable intact from the channels without any substantial change in the molecular structural properties of the strips, the re-entrant channels being configured to enhance retention of the plurality of strips in the channels; and
wherein the inner resilient tubular member is held out in its laterally expanded position when the plurality of strips are disposed in the channels and recovers to its unexpanded position when the plurality of strips are removed from the channels.

25. A recoverable article comprising:
an inner resilient tubular member having an outer surface including a plurality of channels extending therealong, the inner resilient tubular member having a laterally expanded position and an unexpanded position;
a plurality of strips removably disposed in respective ones of the channels, the strips being removable intact from the channels without any substantial change in the molecular structural properties of the strips, the strips being hollow at least at their end regions; and
wherein the inner resilient tubular member is held out in its laterally expanded position when the plurality of strips are disposed in the channels and recovers to its unexpanded position when the plurality of strips are removed from the channels.

26. A recoverable article comprising:
an inner resilient tubular member having an outer surface including a plurality of channels extending therealong, the inner resilient tubular member having a laterally expanded position and an unexpanded position;
a plurality of strips removably disposed in respective ones of the channels, the strips being removable intact from the channels without any substantial change in the molecular structural properties of the strips, each strip comprising a plurality of longitudinally spaced-apart holdout members that substantially fill its respective one of the channels at discrete positions along the respective one of the channels, successive holdout members of each strip being linked together through link portions which do not substantially fill the respective one of the channels; and
wherein the inner resilient tubular member is held out in its laterally expanded position when the plurality of strips are disposed in the channels and recovers to its unexpanded position when the plurality of strips are removed from the channels.

* * * * *